United States Patent [19]

Ogawa

[11] Patent Number: 5,013,471
[45] Date of Patent: May 7, 1991

[54] MAGNETIC FLUID, METHOD FOR PRODUCING IT AND MAGNETIC SEAL MEANS USING THE SAME

[75] Inventor: Kazufumi Ogawa, Hirakata, Japan

[73] Assignee: Matsushita Electric Industrial Co., Ltd., Osaka, Japan

[21] Appl. No.: 359,337

[22] Filed: May 31, 1989

[30] Foreign Application Priority Data

Jun. 3, 1988 [JP] Japan .................................. 63-137822

[51] Int. Cl.$^5$ .............................................. H01F 1/28
[52] U.S. Cl. ............................. 252/62.52; 252/62.51
[58] Field of Search ................. 252/62.51 R, 62.52, 252/351, 315.2

[56] References Cited

U.S. PATENT DOCUMENTS

| | | | |
|---|---|---|---|
| 4,007,313 | 2/1977 | Higuchi et al. | 252/62.51 |
| 4,076,890 | 2/1978 | Yamada et al. | 428/337 |
| 4,356,098 | 10/1982 | Chagnon | 252/62.51 |

Primary Examiner—Gary P. Straub
Assistant Examiner—Stephen G. Kalinchak
Attorney, Agent, or Firm—Stevens, Davis, Miller & Mosher

[57] ABSTRACT

Disclosed herein are a magnetic fluid, a method for the production thereof, and a magnetic seal apparatus using the same, characterized in that the surfaces of ferromagnetic particles are covered with a monomolecular adsorbed film composed of a chloro-silane type surfactant, and the coated particles are dispersed in an oil. A magnetic seal apparatus using such a magnetic fluid.

8 Claims, 1 Drawing Sheet

MAGNETIC FLUID, METHOD FOR PRODUCING IT AND MAGNETIC SEAL MEANS USING THE SAME

BACKGROUND OF THE INVENTION

1. Field of the Invention

This invention relates to a magnetic fluid used at seal rings of shafts, etc., a method for producing such a magnetic fluid, and a magnetic seal means using the same.

2. Prior Art

Hitherto, magnetic fluids have generally been produced by a method in which the surfaces of fine particles of a ferromagnetic material such as $fe_2O_3$, $Fe_3O_4$ or Co-added $\gamma$-$Fe_2O_3$ are coated with a surfactant such as oleic acid, and said coated particles are dispersed in an oil such as kerosene.

The above-described conventional method, however, although simple and easy to carry out, had the problem that since the surfactant such as oleic acid only adheres to the surfaces of the fine particles of a magnetic material, said surfactant would dissociate from the particle surfaces after long-term use, causing agglomeration of said particles. Thus, the magnetic fluid produced by said conventional method was low in reliability and unsatisfactory in performance for use as a sealant in high-vacuum systems.

SUMMARY OF THE INVENTION

In view of said problems of the conventional method, the present invention is intended to provide a method for producing a magnetic fluid which won't be degraded in quality even if used over a long period by virtue of chemical linkage of the ferromagnetic particle surfaces and the surfactant, and to thereby improve reliability of magnetic seals.

BRIEF DESCRIPTION OF THE DRAWINGS

FIGS. 1 and 2 are sectional views of a fine particle of a ferromagnetic material for illustrating the method of this invention, wherein FIG. 1 is a schematic illustration and FIG. 2 partially shows a fine particle of a ferromagnetic material formed with a monomolecular adsorbed film, in which the encircled portion A in FIG. 1 is shown enlarged to the molecular level.

Figure 1:
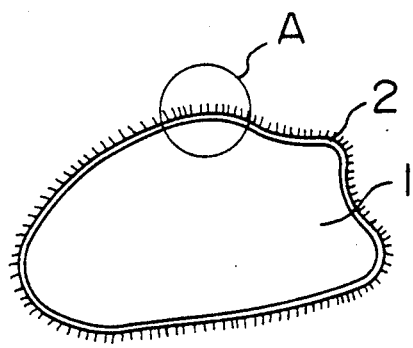

In the drawings, 1 designates a fine particle of a ferromagnetic material, 2 and 3 monomolecular films, 4 a magnetic fluid, 5 a magnetized shaft, 6 a bearing, and 7 a ring magnet.

DETAILED DESCRIPTION OF PREFERRED EMBODIMENTS

This invention provides a magnetic fluid characterized in that the fine particles of a ferromagnetic material having their surfaces coated with a monomolecular adsorbed film made of a chloro-silane type surfactant is dispersed in an oil. Said chloro-silane type surfactant preferably contains straight hydrocarbon chains, and the number of carbons in the hydrocarbon chain is preferably 10 to 25. Fluorine atoms may be contained at a part of hydrocarbon chain of said chloro-silane type surfactant. Also, said silane type surfactant and the surfaces of fine particles of a ferromagnetic material should be chemically bonded to each other.

The present invention further provides a method of producing a magnetic fluid, comprising a step in which a silane type surfactant is chemically adsorbed on the surfaces of fine particles of a ferromagnetic material in a non-aqueous organic solvent to directly effect chemical linkage of silicon of said surfactant and oxygen on the surfaces of said fine particles of a ferromagnetic material to form a monomolecular film, and a step in which the fine particles of a ferromagnetic material formed with said monomolecular film are dispersed in an oil.

The chemical materials containing —SiCl group at the end of molecular chain or the chemical materials represented by the formula $CH_3$—$(CH_2)_n$—$SiCl_3$ (n: an integer) may be used as chloro-silane surfactant in this invention. It is also preferred in this invention that the fine particles of a ferromagnetic material are those of magnetite ($Fe_3O_4$), fluorinated oil is used as the non-aqueous oil, and fluorine atoms are contained at a part of hydrocarbon chain of the silane type surfactant.

The magnetic fluid produced according to this invention is covered with high density, pinhole-free organic monomolecular film in which the film is chemically bonded directly to the surfaces of fine particles of ferromagnetic material, so that even if it is used in a moist atmosphere, the fine particles of ferromagnetic material won't be degraded. Also, since the organic film is chemically bonded directly to the surfaces of fine particles of ferromagnetic material and also very thin and uniform in thickness, there is little fear of separation of surfactant even in long-time use and the reliability is high. Use of such a magnetic fluid, therefore, makes it possible to realize a magnetic seal means with an extremely high reliability.

EXAMPLE

An example of the present invention will be described below with reference to FIGS. 1 and 2.

As illustrated in FIG. 1, a chloro-silane surfactant is adsorbed on the surfaces of fine particles 1 of a ferromagnetic material (for example, a magnetic metal such as Fe-Ni, Ni-Co, etc., or a magnetic metal oxide such as $Fe_2O_3$, $Fe_3O_4$, etc.) by carrying out an adsorption reaction according to a chemical adsorption method to form a monomolecular protective film 2 composed from said chloro-silane surfactant. Used as said silane surfactant is, for instance, a compound of the formula $CH_3$—$(CH_2)_n$—$SiCl_3$ (n being an integer, preferably about 10 to 25 because of ease of handling), and an 80% n-hexane, 12% carbon tetrachloride or 8% chloroform solution of said surfactant dissolved to a concentration of about $2 \times 10^{-3}$ to $5 \times 10^{-2}$ mol/l is prepared and said fine particles of ferromagnetic material are immersed in said solution for about 30 min. at room temperature. In this operation, since a natural oxide is formed on the surfaces of fine particles of a magnetic metal and a magnetic metal oxide is naturally an oxide at its surface, —OH groups are contained in the surfaces in either case. Accordingly, —$SiCl_3$ group and —OH undergo a dehydrochlorination reaction to give rise to a

Figure 2:
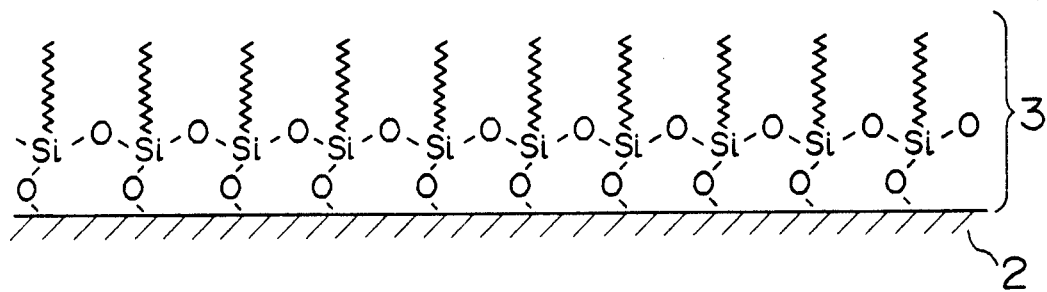

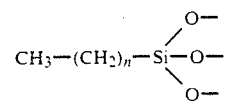

linkage, thus forming a single layer (20-30 Å thick) of monomolecular film 3 of silane surfactant on the surfaces of fine particles of magnetic material (see FIG. 2).

Then, after washed said fine particles of magnetic material with a non-aqueous organic solvent, the particles are mixed in an oil such as kerosene or fluorinated oil and dispersed uniformly by a homogenizer or other like means, and then the whole composition is magnetized to produce a magnetic fluid 4. In case of using fluorinated oil as the oil, it is recommended to employ a material containing a fluorine atom such as —$CF_3$ group at the molecular chain end of chloro-silane surfactant since such a material can improve compatibility with the oil.

The material used for chemical adsorption in this invention is not limited to the silane type surfactant mentioned in the Example; it is possible to use, as well, other types of surfactant as far as they include a group (such as

group) having bondability to —OH group.

The magnetic fluid obtained according to the method of this invention described above is covered with high density, pinhole-free monomolecular film in which the film is chemically bonded directly to the surfaces of fine particles of ferromagnetic material, so that even when it is used in a humid atmosphere, the fine particles of ferromagnetic material won't be affected in quality. Further, since the organic film is chemically bonded directly to the surfaces of fine particles of magnetic material and also very thin and uniform in thickness, there is no likelihood of the surfactant being separated even after long-time use, thus assuring high product reliability. Use of such a magnetic fluid, therefore, makes it possible to realize a seal with extremely high reliability in use.

Figure 3:
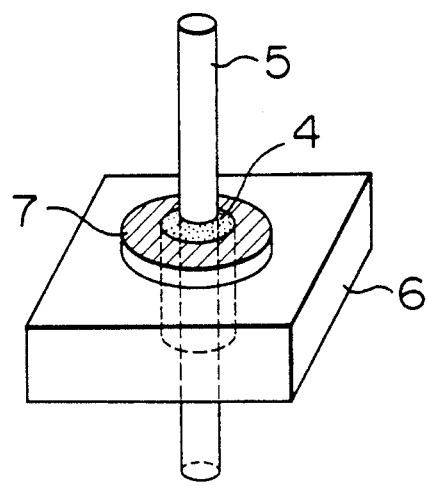
FIG. 3 is a perspective view of a magnetic seal using a magnetic fluid according to this invention.

A magnetic seal using a magnetic fluid of this invention is explained below with reference to FIG. 3. In order to enhance an airtight state between shaft 5 and bearing 6, ring magnet 7 is fixed to bearing 6 so that magnetic fluid 4 is secured in the space between a magnetized shaft 5 and ring magnet 6 by a magnetic force. This improves airtight state against gas, etc., while minimizing frictional forces at the rotating portion.

What is claimed is:

1. A magnetic fluid comprising particles of a ferromagnetic material having their surfaces covered with a monomolecular chemically adsorbed film formed from a chloro-silane surfactant, wherein the number of carbons in the hydrocarbon chain of the chloro-silane surfactant is 10 to 25, said particles of magnetic material being dispersed in an oil.

2. A magnetic fluid according to claim 1, wherein some of the hydrogen atoms of the hydrocarbon chain of the chloro-silane surfactant are substituted by fluorine atoms, and a fluorinated oil is used as the oil.

3. A magnetic fluid according to either claim 1 or 2, wherein the chloro-silane surfactant is chemically bonded to the ferromagnetic material with —Si-O- bond at the surfaces of the particles of the ferromagnetic material.

4. A method for producing a magnetic fluid comprising chemically adsorbing a chloro-silane surfactant on the surfaces of particles of a ferromagnetic material in a non-aqueous organic solvent so that silicon of said surfactant will be chemically bonded to the ferromagnetic material with —Si-O- bond at the surface of said particles of magnetic material to form a monomolecular film, said method including the step of dispersing said particles of ferromagnetic material formed with a monomolecular film in an oil.

5. The method for producing a magnetic fluid according to claim 4, wherein a molecule of the chloro-silane surfactant contains —SiCl group.

6. The method for producing a magnetic fluid according to claim 5, wherein a chemical substance represented by the formula $CH_3$—$(CH_2)_n$-$SiCl_3$ (n being an integer) of 10 to 25 is used as chloro-silane surfactant.

7. The method for producing a magnetic fluid according to claim 5 or 6, wherein the particles of ferromagnetic material are those of magnetite ($Fe_3O_4$).

8. The method for producing a magnetic fluid according to claim 6, wherein a fluorinated oil is used as the oil, and some of the hydrogen atoms of a hydrocarbon chain in the chloro-silane surfactant are substituted by fluorine atoms.

* * * * *